United States Patent [19]

Kotzin

[11] Patent Number: 4,839,923

[45] Date of Patent: Jun. 13, 1989

[54] METHOD AND APPARATUS FOR TIME COMPANDING AN ANALOG SIGNAL

[75] Inventor: Michael D. Kotzin, Buffalo Grove, Ill.

[73] Assignee: Motorola, Inc., Schaumburg, Ill.

[21] Appl. No.: 941,254

[22] Filed: Dec. 12, 1986

[51] Int. Cl.⁴ .............................. G10L 3/02; H04J 3/06
[52] U.S. Cl. ........................................ 381/31; 381/34; 341/143; 370/29; 370/109
[58] Field of Search ...................................... 381/29–35; 370/29, 80, 109; 375/27, 28, 58, 101; 340/347 AD; 341/126, 141

[56] References Cited

U.S. PATENT DOCUMENTS

| 3,150,374 | 9/1964 | Sunstein et al. | 343/204 |
| 3,646,441 | 2/1972 | Magnuski | 325/13 |
| 3,827,052 | 7/1974 | Tanaka | 370/29 |
| 4,053,712 | 10/1977 | Reindl | 381/31 |
| 4,124,773 | 11/1978 | Elkins | 381/31 |
| 4,151,517 | 4/1979 | Kelley | 375/28 |
| 4,356,353 | 10/1982 | Eng et al. | 179/15.55 |
| 4,450,554 | 5/1984 | Steensona et al. | 370/80 |
| 4,622,690 | 11/1982 | Smith III et al. | 381/31 |
| 4,630,257 | 12/1986 | White | 370/109 |

OTHER PUBLICATIONS

Lee, "Time Compression and Expansion of Speech by the Sampling Method", Journal of Audio Engineering Society, vol. 20, No. 9, pp. 738-742, Nov., 1972, Francis F. Lee, Department of Electrical Engineering, Massachusetts Institute of Technology, Cambridge, Mass.
"Time Compression-Multiplex Transmission", Proc. I.E.E., vol. III, No. 4, pp. 647-664, Apr., 1964, Flood et al.
"Time Compression Multiplexing for Loop Transmission of Speech Signals", I.E.E.E. Trans. of Comm., vol. COM-22, No. 12, pp. 1932-1939, Dec., 1974, Morgen et al.
Motorola, Inc., Specifications and Application Information, No. DS9488 R1, 1983.

Primary Examiner—Vit W. Miska
Attorney, Agent, or Firm—Thomas G. Berry; Wayne J. Egan

[57] ABSTRACT

A method and apparatus to compand an analog message to afford a two-to-one improvement in spectral efficiency, while contemporaneously minimizing distortion in the received signal. According to the invention, an analog message such as a voice message is digitized in a continuously variable slope delta modulator (CVSD) and stored at a first rate. The digitized message is removed from the storage means, interleaved with a predetermined signal, and converted back into an analog message in a continuously variable slope delta demodulator at a second rate being at least twice as fast as the first rate. The analog signal is then transmitted during at least one time slot of a communication channel. The predetermined pattern operates to minimize the distortion ordinarily created by digitizing the analog signal.

8 Claims, 2 Drawing Sheets

100

400

300

METHOD AND APPARATUS FOR TIME COMPANDING AN ANALOG SIGNAL

TECHNICAL FIELD

This invention relates generally to time compression and the corresponding expansion (companding) of analog signals, and in particular to companding voice signals to achieve spectral efficiency.

BACKGROUND ART

Contemporary communication system designers are continuously challenged with transmitting more and more information down a given communication channel. For example, the current standard for a land mobile communication channel comprises a radio frequency channel having a bandwidth of 25 kHz for one message. Conventionally, two such channels are required for a full duplex conversation: one to transmit, and one to receive. As available frequency spectrum diminishes, the need to transmit more information down a communication channel becomes paramount. This need is experienced today in urban areas where a limited amount of frequency spectrum must be shared by a large number of transceivers in a given geographic area.

One technique to send more information down a communication channel is time compression multiplexing (TCM). A TCM communication system comprises an analog system wherein analog signals are sampled and stored in a storage means. The samples are extracted, in turn, and transmitted at a high rate of speed. In this way, several signals may be sent over the same communication channel in a time division multiplex (TDM) fashion. In a TDM system, a communication channel is divided into a plurality of slots. Each transceiving device may transmit or receive information in one or more of the slots.

TCM advantageously exploits the fact that time compression merely scales the occupied spectrum in relation to a time scaling factor. Accordingly, two voices compressed by approximately 2:1 may be transmitted over a single conventional 25 kHz radio channel by slightly reducing the deviation, and improving filtering to reduce adjacent channel "splatter". TCM stands in contrast to digital coding techniques that require considerably more complexity and processing for a speech signal to occupy a given bandwidth.

The TCM slot duration (i.e., the duration of the speech burst), is selected by balancing several considerations, including audio delay (preferably small), and the limitations of adapting a transceiving device from the transmit to the receive mode, or vice versa (i.e., synthesizer and antenna switch settling times). A typical value for a 2:1 compression system comprises a 60 ms slot. A full duplex system is synchronized such that immediately after transmitting information in a slot, the transceiver adapts to receive information from a subsequent slot. This alternating transceiving procedure operates to allow continuous communication between two parties simultaneously.

TCM communication systems, however, suffer a detriment stemming from the fact that the recovered analog signal is discontinuous at the slot boundaries. In FIG. 1, a typical TCM signal recovery process 100 is shown. A time compressed signal is initially received in a series of time slots (102, 104, and 106). The information in each slot is expanded by the inverse of the compression ratio, and the signal is recovered by concatenating the information in a contiguous manner as shown (102', 104', and 106'). However, at the slot boundaries, discontinuities generally appear due to the limited bandwidth communication channel and imperfections in timing recovery at the receiver. These discontinuities cause distortion in the recovered signal As used herein, the boundary areas of the reconstructed slots is referred to as the "splice-zone". The "splice-zone distortion" 108 generally manifests itself in the reconstructed waveform as "pops" and "clicks" occurring at the TDM frame (slot) rate. To solve this problem, some designers have installed gain compression devices to lower the gain in the splice-zone to avoid amplifying the clicks and pops resulting from the distortion. Such gain compressors are both expensive and complicated since they must effectively reduce the gain in the splice-zone and restore it in a controlled fashion to properly amplify the intelligible information.

Generally, transceiving devices may be mobile units, portable units, or base stations. Generally, a portable unit is defined as a communication unit typically designed to be carried on or about the person. A mobile unit is a transceiving device designed to be installed in vehicles. A base station is contemplated to be a transceiving device permanently or semipermanently installed at a fixed location. As used herein, all of these devices are collectively referred to herein as transceiving devices.

Accordingly, a need exists for a spectrally efficient communication system capable of supplying increased information content down a limited bandwidth channel without introducing splice-zone distortion as in prior systems.

SUMMARY OF THE INVENTION

Accordingly, it is an object of the present invention to provide a spectrally efficient communication system.

It is another object of the present invention to provide a spectrally efficient communication system that minimizes splice-zone distortion.

It is a further object of the present invention to provide a time compander that eliminates the need for complicated gain compressors.

It is yet another object of the present invention to provide a transceiving device having reduced circuitry while providing the capability of a full duplex communication using only one 25 kHz land mobile channel.

Accordingly, these and other objects are achieved in using the method and apparatus for time companding an analog signal as taught by the present invention.

Briefly, according to the invention, an analog message such as a voice message is digitized in a continuously variable slope delta-modulator (CVSD) and stored in a digital storage means at a first rate. The digitized message is removed from the storage means and converted back into an analog message using a continuously variable slope delta-demodulator at a second rate being at least twice as fast as the first rate. The analog signal is then transmitted during at least one time slot of a communication channel By combining the advantages of CVSD digitization, digital storage, and analog transmission, the present invention overcomes the detriments of the prior art.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

DETAILED DESCRIPTION OF THE PREFERRED EMBODIMENT

Figure 2:
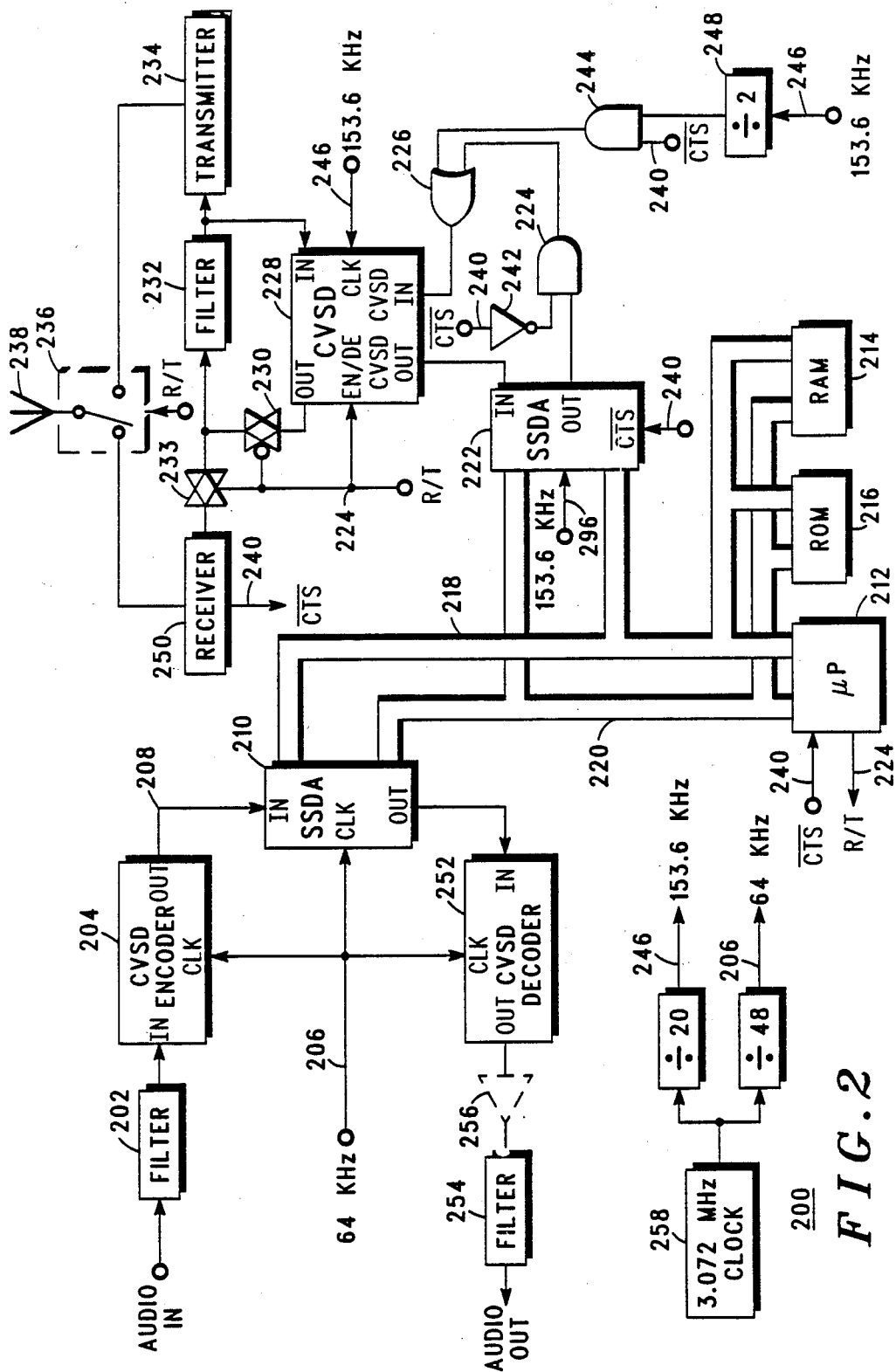
FIG. 2 is a block diagram of a transceiver according to the present invention.

Referring now to FIG. 2, there is shown a block diagram of a full duplex transceiving device in accordance with the present invention. To transmit, a voice signal may be first filtered by filter 202, which provides an appropriately band-limited audio signal to a CVSD encoder 204. Preferably, the CVSD encoder 204 is an MC3518 manufactured by Motorola, Inc., or its functional equivalent. The CVSD encoder 204 continuously digitizes the audio signal at a first rate defined by a clock signal 206. Preferably, this clock rate is 64 kHz although other rates may be used. The digitized audio signal 208 is coupled to a Synchronous Serial Data Adaptor (SSDA) 210. The SSDA 210 receives the digitized signal and, under control of a microprocessor 212, transmits the digitized information to a digital storage device such as random access memory (RAM) 214. Preferably, the SSDA is an MC6852, and the microprocessor is an MC6803, both manufactured by Motorola, Inc., although their functional equivalents may be substituted. Of course, the microprocessor 212 receives its instructions from a read only memory (ROM) 216 and each of the SSDAs, microprocessor(s), RAM(s), and ROM(s) are interconnected with an address bus 218 and a data bus 220. The stored digitized voice is extracted from the RAM 214 and routed to an SSDA 222 for transmission on to at least one time slot of a communication channel. To transmit, the microprocessor 212 places the appropriate logic signal on the R/T line 224. The data exits the SSDA 222 and is presented to an AND gate 224. As a second input, the AND gate 224 receives an inverted (242) not-clear-to-send ($\overline{CTS}$) signal, which is locally generated in the receiver 250 by any suitable synchronization recovery technique known in the art. Of course, the microprocessor 212 also receives the $\overline{CTS}$ signal, which operates as a slot (frame) marker facilitating proper control of the data flow within the transceiver 200.

When transmitting a message, the $\overline{CTS}$ signal is asserted (logic 0), the inverted (242) form of which enables the CVSD message to pass through the AND gate 224, to the OR gate 226, and finally to the CVSD device 228. The CVSD device 228 operates in the decode mode transmission due to the logical state of the R/T line 224. The R/T line 224 also enables the transmission gate 230 and disables the transmission gate 232. Thus, the stored CVSD signal is routed from the SSDA to the CVSD device 228, which converts the message back into an analog signal at a rate defined by a high speed clock signal 246. Preferably, the frequency of the high speed clock is 153.6 MHz, although other frequencies may be used so long as the the frequency of the high speed clock is slightly greater than twice that of the low speed clock signal 206. The now analog message travels from the CVSD device 228 through the transmission gate 230 to the filter 232, which removes any remaining quantization noise in the converted signal. The filtered signal is then coupled to the transmitter 234. An antenna switch 236 couples the antenna 238 to the transmitter 234 and the voice message is transmitted in at least one time slot of the channel.

Those skilled in the art will appreciate that a small "guard band" is placed between the slots of a TDM communication system to accommodate timing imperfections, propagation delays, or to provide additional signalling, synchronization, or supervisory data. After the message has been transmitted, the $\overline{CTS}$ signal 240 will negate (logic 1), which disables the AND gate 224 and enables the AND gate 244. During this time, the high speed clock signal 246, divided by two (248), is routed via the AND gate 244 and the OR gate 226 to the CVSD device 228. Since the CVSD device is clocked at twice the speed of the signal at its input, an alternating logic 1 - logic 0 pattern will be transmitted in the guard band slot between the slots filled with the voice message. This alternating logic 1 - logic 0 pattern is commonly referred to as the "dotting" pattern.

When receiving a message from the channel, the microprocessor 212 places the appropriate signal on the R/T line 242. This causes the antenna 238 to be coupled to a receiver 250 via the antenna switch 236. The received signal is routed via the transmission gate 233 to the filter 232 and into the CVSD device 228. In the receive mode, the same CVSD device used as a decoder in the transmit mode (228), operates as an encoder to digitize the received analog signal. The received signal is also coupled to the transmitter 234, however, this presents no problem since the transmitter is no longer coupled to the antenna. The CVSD device 228 accepts the analog signal and provides a digitized equivalent signal to the SSDA 222 at the rate provided by the high speed clock 246. The SSDA 222, under control of the microprocessor 212, routes the high speed digitized data to the RAM 214. This signal is extracted from the RAM 214 and routed to the SSDA 210, which continuously couples it to a CVSD decoder 252 at the lower data rate (206). The CVSD decoder 252 reconstructs the message as an analog signal and presents it to a filter 254. Optionally, the decoded signal may be amplified in an amplifier 256 prior to filtering. The filter 254 appropriately band-limits the received message and also removes any remaining quantization noise from the message. The recovered signal is then provided to any subsequent circuitry such as an audio power amplifier and speaker. Accordingly, since the transmitter and receiver operate at greater than twice the speed of the CVSD encoder 204 and decoder 252 a full duplex conversation may be had using a single communication channel. This provides a two to one improvement in spectral efficiency.

The conversion of the digitized message back into an analog message affords the present invention the advantages of both digital storage and analog transmission. The selection, by the present invention, of CVSD A/D devices, in combination with the dotting pattern guard band, minimizes the splice-zone distortion experienced by TCM communication systems.

Figure 3:
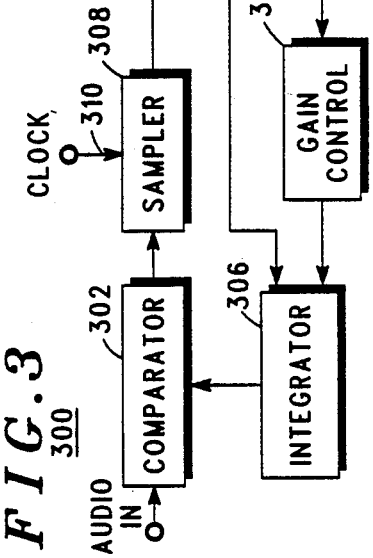
FIG. 3 is a block diagram of a typical continuously variable slope delta-modulator.

In FIG. 3 there is shown a block diagram of a typical Continuously Variable Slope Delta-Modulator (CVSD) 300. To digitize an analog signal, a comparator 302 compares the analog signal with a second signal 304 provided by an integrator (generally leaky) 306. The output of the comparator 302 reflects the sign difference between the audio signal and the feedback signal 304. This signal is sampled in the sampler 308 at a given clock rate 310. The sampler outputs a digital signal 312, which represents a digitized analog signal that may be stored or transmitted. The CVSD signal 312 is received by the integrator 306 and a coincidence detector 314. The purpose of the coincidence detector 314 is to look for a predetermined number (typically three or four) of digital output bits that all have the same level (i.e., either logic 1 or logic 0. Should the coincidence detector detect four consecutive identical logic levels, a signal to the gain control 316 would increase the gain of the integrator 306. Conversely, the absence of four consecutive levels causes the gain of the integrator 306 to be reduced. In this way, the dynamic range of the CVSD device 300 is improved as is known in the art.

In the decode mode, a received CVSD signal is applied (312) to the coincidence detector 314 and the integrator 306. The coincidence detector 314 controls the gain control device 316, which, in turn, controls the gain of the integrator 306. The integrator output (304) is provided as the decoded output signal to any subsequent circuitry as is known in the art.

Figure 1:
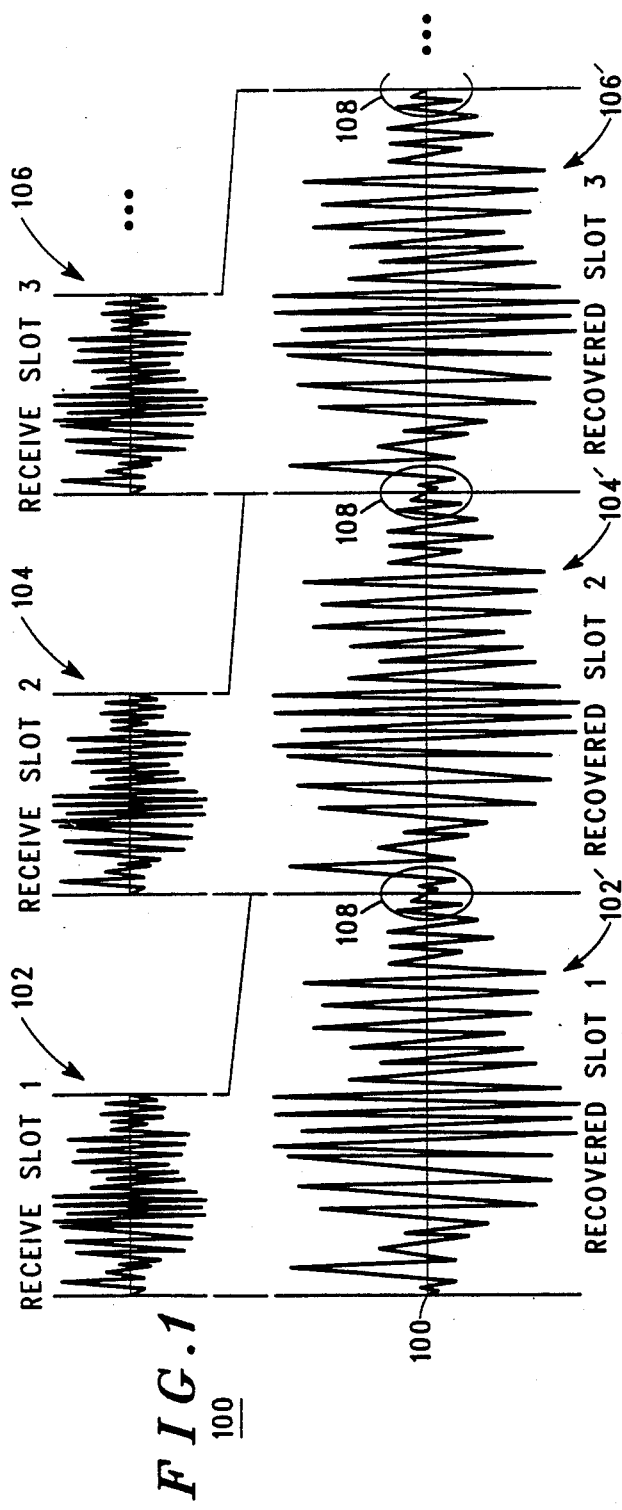
FIG. 1 is an illustration of a received TDM voice signal and the associated splice-zone distortion.
Figure 4:
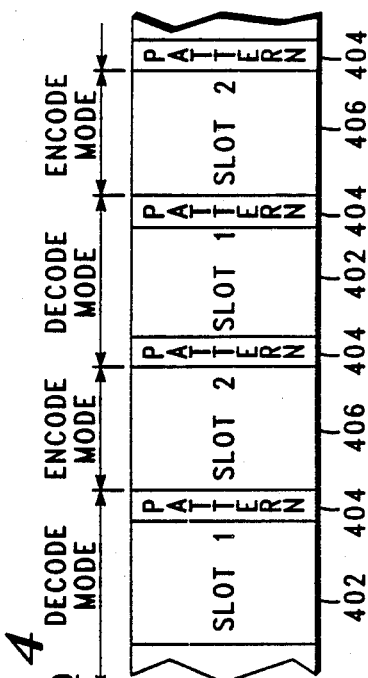
FIG. 4 is an illustration of the data flow to the CVSD device 228 of FIG. 2.

Referring now to FIG. 4, the data flow 400 of the CVSD device 228 is shown As previously mentioned, the present invention contemplates filling a time frame corresponding to the channel guard band with an alternating logic 1 - logic 0 (dotting) pattern. The dotting pattern assures the absence of coincidence in the CVSD device 228. Thus, as described in conjunction with FIG. 3, the gain of the CVSD device is minimized between slots thereby minimizing splice-zone distortion. The use of the dotting pattern also causes the integrator output signal 304 (see FIG. 3) to decay to a center value 110 (see FIG. 1) in a consistent fashion. This gradual decay and center starting point also aids in reducing splice-zone distortion. This eliminates the need for post-reconstruction gain compressors required by other techniques implementing TCM. Thus, the data flow 400 of the CVSD device 228 comprises at least two time slots 402 and 406 (corresponding to the communication channel slots) alternately interleaved with a predetermined pattern 404, which preferably comprises a dotting pattern. Accordingly, the CVSD device 228 (see FIG. 2) operates in the decode mode during data portions 402 and 404, and operates in the encode mode only during portion 406.

While a particular embodiment of the invention has been described and shown, it should be understood that the invention is not limited thereto since many modifications may be made. It is therefore contemplated to cover by the present application any and all such modifications that may fall within the true spirit and scope of the basic underlying principles disclosed and claimed herein.

What is claimed is:

1. A method for compressing an analog signal, comprising the steps of:
   (a) digitizing the analog signal at a first rate using a continuously variable slope delta modulator to provide a digitized signal;
   (b) storing said digitized signal at said first rate in a digital storage means to provide a stored signal;
   (c) retrieving a time segment of said stored signal from said digital storage means at a second rate, said second rate being at least twice that of said first rate, to provide a time segment retrieved signal;
   (d) converting said time segment retrieved signal into an analog signal using a continuously variable slope delta demodulator to provide a compressed signal.

2. A method for expanding a time segment time compressed analog signal, comprising the steps of
   (a) digitizing the time segment compressed signal at a first rate using a continuously variable slope delta modulator to provide a time segment digitized signal;
   (b) storing said time segment digitized signal at said first rate in a storage means to provide a time segment stored signal;
   (c) retrieving said time segment stored signal from said storage means at a second rate, said first rate being at least twice that of said second rate, to provide a time segment retrieved signal;
   (d) converting said time segment retrieved signal into an analog signal using a continuously variable slope delta demodulator to provide an expanded signal.

3. A method of companding an analog signal, comprising the steps of:
   (a) digitizing the analog signal at a first rate using a continuously variable slope delta modulator to provide a first digitized signal;
   (b) storing said first digitized signal at said first rate in a storage means to provide a first stored signal;
   (c) retrieving a time segment of said first stored signal from said storage means at a second rate, said second rate being at least twice that of said first rate, to provide a time segment first retrieved signal;
   (d) converting said time segment first retrieved signal into an analog signal using a continuously variable slope delta demodulator to provide a time segment compressed signal;
   (e) digitizing said time segment compressed signal at said second rate using a continuously variable slope delta modulator to provide a time segment second digitized signal;
   (f) storing said time segment second digitized signal at said second rate in a storage means to provide a time segment second stored signal;
   (g) retrieving said time segment second stored signal from said storage means at said first rate to provide a time segment second retrieved signal;
   (h) converting said time segment second retrieved signal into an analog signal using a continuously variable slope delta demodulator to provide an expanded signal.

4. A full duplex transceiving device, for time compression multiplexing an analog signal, comprising:
   means for storing a first and second digitized signal each having a respective data rate, said second rate being at least twice that of said first rate, to provide a first and second stored signal;
   means for retrieving said first and second stored signals from said storage means at converse data rates to provide a first and second retrieved signal;
   first continuously variable slope delta modulator/demodulator means for alternately converting said first retrieved signal at said second data rate to provide a compressed analog signal, and for digitizing a received compressed analog signal at said second data rate provide said second digitized signal;
   second continuously variable slope delta modulator/demodulator means for continuously digitizing the analog signal at said first data rate provide said first digitized signal;

means for transmitting said compressed analog signal during at least one time slot of a communication channel;

means for receiving said compressed analog signal during at least one time slot of said communication channel to provide said received compressed analog signal;

third continuously variable slope delta modulator/demodulator means for continuously converting said second retrieved signal into an analog signal at said first data rate to provide a expanded recovered signal;

whereby, said first continuously variable slope delta modulator/demodulator means is multiplexed at said second data rate, and said second and third continuously variable slope delta modulator/demodulator means continually operate at said first data rate to provide full duplex communication on a single communication channel.

5. A compressor for compressing an analog signal, comprising:

continuously variable slope delta modulator means for digitizing the analog signal at a first rate to provide a digitized signal;

means for storing said digitized signal at said first rate to provide a stored signal;

means for retrieving a time segment of said stored signal from said storage means at a second rate, said second rate being at least twice that of said first rate, to provide a time segment retrieved signal;

continuously variable slope delta demodulator means for converting said time segment retrieved signal into an analog signal to provide a compressed signal.

6. An expandor for expanding a time segment time compressed analog signal, comprising:

continuously variable slope delta modulator means for digitizing the time segment compressed signal at a first rate to provide a time segment digitized signal;

means for storing said time segment digitized signal at said first rate to provide a time segment stored signal;

means for retrieving said time segment stored signal from said storage means at a second rate, said first rate being at least twice that of said second rate, to provide a time segment retrieved signal;

continuously variable slope delta demodulator means for converting said time segment retrieved signal into an analog signal to provide an expanded signal.

7. A method for minimizing distortion in a time compressed analog transmission system, comprising the transmitter steps of:

(a) digitizing an analog signal at a first rate in a continuously variable slope delta modulator to provide a digitized signal;

(b) storing said digitized signal at said first rate in a digital storage means to provide a stored signal;

(c) retrieving said stored signal from said digital storage means at a second rate, said second rate being at least twice that of said first rate, to provide a retrieved signal;

(d) interleaving said retrieved signal with a predetermined digital pattern to provide an interleaved signal;

(e) converting said interleaved signal into an analog signal in a continuously variable slope delta demodulator to provide a compressed signal;

(f) transmitting at least said compressed signal.

8. A method for minimizing distortion in a time compressed analog transmission system, comprising the transmitter steps of:

(a) digitizing an analog signal at a first rate in a continuously variable slope delta modulator to provide a digitized signal;

(b) storing said digitized signal at said first rate in a digital storage means to provide a stored signal;

(c) retrieving said stored signal from said digital storage means at a second rate, said second rate being at least twice that of said first rate, to provide a retrieved signal;

(d) interleaving said retrieved signal with an alternating logic 1 - logic 0 (dotting) pattern to provide an interleaved signal;

(e) converting said interleaved signal into an analog signal in a continuously variable slope delta demodulator to provide a compressed signal;

(f) transmitting at least said compressed signal.

* * * * *

UNITED STATES PATENT AND TRADEMARK OFFICE
CERTIFICATE OF CORRECTION

PATENT NO. : 4,839,923

DATED : 6/13/89

INVENTOR(S) : Kotzin, Michael D.

It is certified that error appears in the above-identified patent and that said Letters Patent is hereby corrected as shown below:

Col. 2, line 6, "recovered signal As" should be --recovered signal. As--.

Col. 1, line 49, "burst)," should be --burst)--.

Col. 6, line 65, "rate provide" should be --rate to provide--.

Col. 7, line 1, "rate provide" should be --rate to provide--.

Col. 7, line 13, "provide a expanded" should be --provide an expanded--.

Signed and Sealed this

Seventh Day of May, 1991

Attest:

HARRY F. MANBECK. JR.

Attesting Officer

Commissioner of Patents and Trademarks